United States Patent
Norley et al.

(10) Patent No.: US 6,613,252 B2
(45) Date of Patent: Sep. 2, 2003

(54) MOLDING OF MATERIALS FROM GRAPHITE PARTICLES

(75) Inventors: Julian Norley, Chagrin Falls, OH (US); Michael Lee Warddrip, Hillsboro, OR (US); Daniel Witold Krassowski, Columbia Station, OH (US); Robert Angelo Mercuri, Seven Hills, OH (US)

(73) Assignee: Advanced Energy Technology Inc., Wilmington, DE (US)

( * ) Notice: Subject to any disclaimer, the term of this patent is extended or adjusted under 35 U.S.C. 154(b) by 0 days.

(21) Appl. No.: 09/872,710

(22) Filed: Jun. 1, 2001

(65) Prior Publication Data

US 2002/0180091 A1 Dec. 5, 2002

(51) Int. Cl.$^7$ .......................... B29B 17/00; C04B 35/00
(52) U.S. Cl. ................... 264/37.1; 264/37.3; 264/105
(58) Field of Search ................ 264/105, 37.1, 264/37.3

(56) References Cited

U.S. PATENT DOCUMENTS

| | | | |
|---|---|---|---|
| 3,404,061 A | 10/1968 | Shane et al. | 161/125 |
| 3,932,568 A | * | 1/1976 | Watts et al. ................... 264/29 |
| 4,895,713 A | 1/1990 | Greinke et al. | 423/448 |
| 5,753,018 A | * | 5/1998 | Lamport et al. ............... 106/36 |
| 5,846,459 A | 12/1998 | Mercuri | 264/42 |
| 5,882,570 A | 3/1999 | Hayward | 264/328.18 |
| 5,885,728 A | 3/1999 | Mercuri et al. | 429/30 |
| 5,902,762 A | 5/1999 | Mercuri et al. | 501/99 |
| 6,037,074 A | 3/2000 | Mercuri et al. | 429/34 |
| 6,217,800 B1 | 4/2001 | Hayward | 264/29.1 |
| 2002/0014165 A1 | * | 2/2002 | Norley et al. ............... 428/408 |

FOREIGN PATENT DOCUMENTS

JP  4160271 A  6/1992

OTHER PUBLICATIONS

Derwent Abstracts, 2001–505538, Production of electroconductive resin moldings and separator of fuel, Copyright 1999.*
International Publication No. WO 00/64808, International Publication Date Nov. 2, 2000, "Flexible Graphite Article And Method Of Manufacture", UCAR graph–Tech Inc.
International Publication No. WO 00/54953, International Publication Date Nov. 2, 2000, "Graphite Foam Material and Method of Making Same", SGL Technic, Inc. (Inventor Hayward).

* cited by examiner

Primary Examiner—Christopher A. Fiorilla
(74) Attorney, Agent, or Firm—Waddey & Patterson, P.C.; James R. Cartiglia

(57) ABSTRACT

A method of manufacturing material suitable for the construction of a component of a fuel cell, such as a flow field plate or electrode. Uncured resin impregnated flexible graphite sheet is ground into particles. Without re-expanding the particles, and without adding further resin to the particles, the particles are molded into the form of the desired material. The material is then cured. Additives may be mixed with the particles to improve the properties of the material.

20 Claims, 3 Drawing Sheets

MOLDING OF MATERIALS FROM GRAPHITE PARTICLES

The benefit of priority under 35 U.S.C. §120 is hereby claimed to U.S. patent application Ser. No. 09/595,754, filed on Jun. 16, 2000 which issued as U.S. Pat. No. 6,503,626.

TECHNICAL FIELD

A method is provided for manufacturing materials useful for the construction of components of proton exchange membrane fuel cells from recycled flexible graphite materials. The method is particularly useful for the manufacture of materials useful in the manufacture of flow field plates and electrodes for such fuel cells.

BACKGROUND OF THE ART

An ion exchange membrane fuel cell, more specifically a proton exchange membrane (PEM) fuel cell, produces electricity through the chemical reaction of hydrogen and oxygen in the air. Within the fuel cell, electrodes denoted as anode and cathode surround a polymer electrolyte to form what is generally referred to as a membrane electrode assembly, or MEA. Oftentimes, the electrodes also function as the gas diffusion layer (or GDL) of the fuel cell. A catalyst material stimulates hydrogen molecules to split into hydrogen atoms and then, at the membrane, the atoms each split into a proton and an electron. The electrons are utilized as electrical energy. The protons migrate through the electrolyte and combine with oxygen and electrons to form water.

A PEM fuel cell includes a membrane electrode assembly sandwiched between two graphite flow field plates. Conventionally, the membrane electrode assembly consists of random-oriented carbon fiber paper electrodes (anode and cathode) with a thin layer of a catalyst material, particularly platinum or a platinum group metal coated on isotropic carbon particles, such as lamp black, bonded to either side of a proton exchange membrane disposed between the electrodes. In operation, hydrogen flows through channels in one of the flow field plates to the anode, where the catalyst promotes its separation into hydrogen atoms and thereafter into protons that pass through the membrane and electrons that flow through an external load. Air flows through the channels in the other flow field plate to the cathode, where the oxygen in the air is separated into oxygen atoms, which joins with the protons through the proton exchange membrane and the electrons through the circuit, and combine to form water. Since the membrane is an insulator, the electrons travel through an external circuit in which the electricity is utilized, and join with protons at the cathode. An air stream on the cathode side is one mechanism by which the water formed by combination of the hydrogen and oxygen is removed. Combinations of such fuel cells are used in a fuel cell stack to provide the desired voltage.

The flow field plates have a continuous reactant flow channel with an inlet and an outlet. The inlet is connected to a source of fuel in the case of an anode flow field plate, or a source of oxidant in the case of a cathode flow field plate. When assembled in a fuel cell stack, each flow field plate functions as a current collector.

Electrodes, also sometimes referred to as gas diffusion layers, may be formed by providing a graphite sheet as described herein and providing the sheet with channels, which are preferably smooth-sided, and which pass between the parallel, opposed surfaces of the flexible graphite sheet and are separated by walls of compressed expandable graphite. It is the walls of the flexible graphite sheet that actually abut the ion exchange membrane, when the inventive flexible graphite sheet functions as an electrode in an electrochemical fuel cell.

The channels are formed in the flexible graphite sheet at a plurality of locations by mechanical impact. Thus, a pattern of channels is formed in the flexible graphite sheet. That pattern can be devised in order to control, optimize or maximize fluid flow through the channels, as desired. For instance, the pattern formed in the flexible graphite sheet can comprise selective placement of the channels, as described, or it can comprise variations in channel density or channel shape in order to, for instance, equalize fluid pressure along the surface of the electrode when in use, as well as for other purposes which would be apparent to the skilled artisan.

The impact force is preferably delivered using a patterned roller, suitably controlled to provide well-formed perforations in the graphite sheet. In the course of impacting the flexible graphite sheet to form channels, graphite is displaced within the sheet to disrupt and deform the parallel orientation of the expanded graphite particles. In effect the displaced graphite is being "die-molded" by the sides of adjacent protrusions and the smooth surface of the roller. This can reduce the anisotropy in the flexible graphite sheet and thus increase the electrical and thermal conductivity of the sheet in the direction transverse to the opposed surfaces. A similar effect is achieved with frusto-conical and parallel-sided peg-shaped flat-ended protrusions.

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as graphene layers or basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites possess anisotropic structures and thus exhibit or possess many properties that are highly directional e.g. thermal and electrical conductivity and fluid diffusion.

Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing flexible graphite sheets possess a very high degree of orientation.

As noted above, the bonding forces holding the parallel layers of carbon atoms together are only weak van der Waals forces. Natural graphites can be treated so that the spacing between the superposed carbon layers or laminae can be appreciably opened up so as to provide a marked expansion in the direction perpendicular to the layers, that is, in the "c" direction, and thus form an expanded or intumesced graphite structure in which the laminar character of the carbon layers is substantially retained.

Graphite flake which has been greatly expanded and more particularly expanded so as to have a final thickness or "c"

direction dimension which is as much as about 80 or more times the original "c" direction dimension can be formed without the use of a binder into cohesive or integrated sheets of expanded graphite, e.g. webs, papers, strips, tapes, foils, mats or the like (typically referred to as "flexible graphite"). The formation of graphite particles which have been expanded to have a final thickness or "c" dimension which is as much as about 80 times or more the original "c" direction dimension into integrated flexible sheets by compression, without the use of any binding material, is believed to be possible due to the mechanical interlocking, or cohesion, which is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles and graphite layers substantially parallel to the opposed faces of the sheet resulting from very high compression, e.g. roll pressing. Sheet material thus produced has excellent flexibility, good strength and a very high degree of orientation.

Briefly, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which is as much as about 80 or more times that of the original particles so as to form a substantially flat, flexible, integrated graphite sheet. The expanded graphite particles that generally are worm-like or vermiform in appearance, once compressed, will maintain the compression set and alignment with the opposed major surfaces of the sheet. The density and thickness of the sheet material can be varied by controlling the degree of compression. The density of the sheet material can be within the range of from about 0.04 g/cc to about 2.0 g/cc. The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal and electrical properties of the sheet are very different, by orders of magnitude, for the "c" and "a" directions.

Methods of manufacturing articles from graphite particles have been proposed. For example, U.S. Pat. No. 5,882,570 to Hayward discloses a method of grinding flexible unimpregnated graphite foil to a small particle size, thermally shocking the particles to expand them, mixing the expanded graphite with a thermoset phenolic resin, injection molding the mixture to form low density blocks or other shapes, then heat treating the blocks to thermoset the material. The resulting blocks may be used as insulating material in a furnace or the like.

WO 00/54953 and U.S. Pat. No. 6,217,800, both to Hayward further describe processes related to those of U.S. Pat. No. 5,882,570.

The Hayward processes are very limited in the scope of the source materials they use, and the type of end products they can produce. Hayward uses only unimpregnated graphite source materials, and his finished products are only formed by mixing the graphite particles with large proportions of resin and injection molding the mixture to form articles which are then thermoset.

Accordingly, there is a continuing need in the art for improved processes for producing flexible graphite sheets or products from various types of graphite materials, including those which are already resin impregnated, and for manufacture of more broadly useful products from those materials. Such improved processes are provided by the present invention.

SUMMARY OF THE INVENTION

The present invention provides a method of manufacturing materials suitable for use in the manufacture of components for PEM fuel cells from recycled uncured resin-impregnated flexible graphite sheet material, which is ground into particles and then molded to form the component. The components may include flow field plates and electrodes.

In the production and use of flexible graphite sheets, scrap material may be generated. For example, in the production of flow field plates, a flexible graphite sheet may be shaped, impregnated with a resin, and after impregnation, cured. During this process, scrap flexible graphite sheet material may be produced before impregnation, after impregnation and before curing, and after impregnation and after curing. The scrap flexible graphite sheet material used before impregnation is described herein as regrind material or virgin regrind material. Sheet material produced after impregnation and before curing is described herein as uncured impregnated scrap (production scrap). The material produced after impregnation and after curing is described herein as cured regrind (regrind scrap). The present invention focuses on the use of the uncured resin-impregnated scrap material.

Using the methods of the present invention, this uncured resin-impregnated material can be reground and molded into new flow field plates or electrodes. This is done without re-expanding the particles, and preferably without adding additional resin to the particles. Additives, such as metal or carbon fibers, can be blended with the particles to improve electrical and/or thermal conductivity of the products molded from the particles. Due to the fact that the particles are not re-expanded, these additives are not exposed to the destructive high temperatures that would be encountered in a furnace during a re-expansion process.

The method of the present invention is advantageous because it has a beneficial re-use of the uncured epoxy impregnated scrap created in the production of, for example, flow field plates. The present invention provides an advantageous use for such material and decreases disposal costs.

Specifically, one embodiment of the present invention is a method of manufacturing a material useful for the construction of a component of a fuel cell, comprising:

(a) providing source materials including sheets of uncured resin impregnated graphite material;

(b) grinding the source materials into uncured particles; and (c) without re-expanding the particles, molding the uncured particles to form the component of the fuel cell.

It is an object of the present invention to provide a method for preparing components of fuel cells from recycled materials.

Yet another object of the present invention is to provide material suitable for the construction of a component of a fuel cell manufactured using recycled graphite materials.

Still another object of the present invention is to provide a method for manufacturing a flow field plate or an electrode for a fuel cell from, as a source material, uncured resin impregnated graphite sheet material.

Other and further objects, features, and advantages would be readily apparent to those skilled in the art, upon a reading of the following disclosure when taken in conjunction with the accompanying drawings.

DETAILED DESCRIPTION OF THE INVENTION

Figure 1:
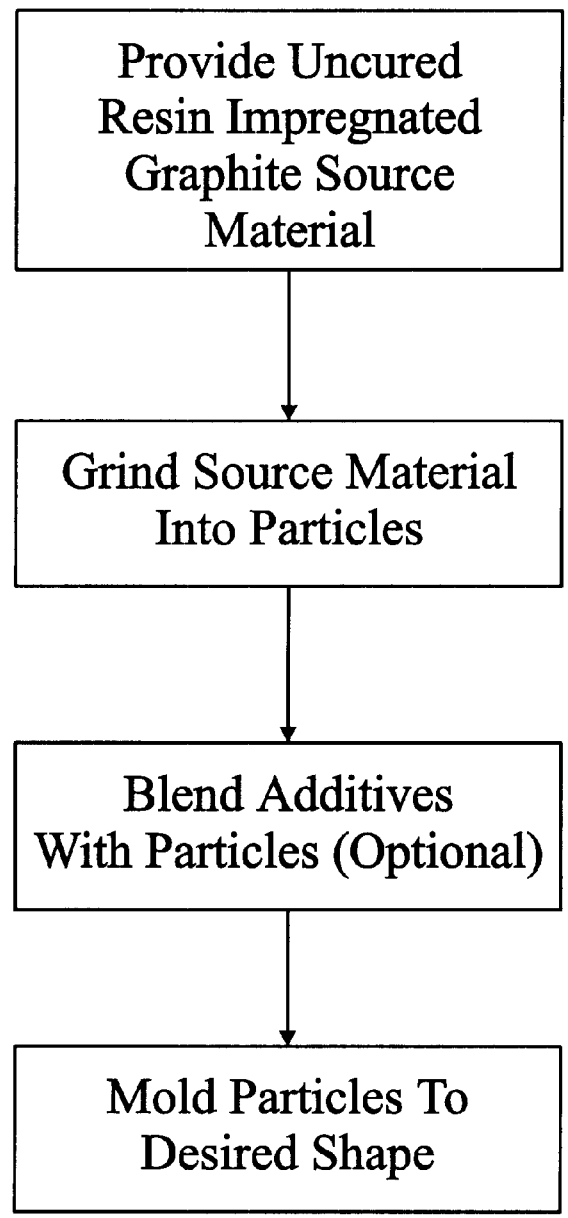
FIG. 1 is a flow chart showing an embodiment of the present invention for manufacture of a flow field plate or an electrode for a fuel cell.

The methods of the present invention comprise providing source materials such as flexible sheets of graphite material. The source materials typically comprise graphite, a crystalline form of carbon comprising atoms covalently bonded in flat layered planes with weaker bonds between the planes. In obtaining source materials such as the above flexible sheets of graphite, particles of graphite, such as natural graphite flake, are typically treated with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact.

Graphite starting materials for the flexible sheets suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials for the flexible sheets used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be exfoliated, is suitable for use with the present invention. Such graphite preferably has an ash content of less than twenty weight percent. More preferably, the graphite employed for the present invention will have a purity of at least about 94%. In the most preferred embodiment, the graphite employed will have a purity of at least about 99%.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solution may contain metal halides such as ferric chloride, and ferric chloride mixed with sulfuric acid, or a halide, such as bromine as a solution of bromine and sulfuric acid or bromine in an organic solvent.

The quantity of intercalation solution may range from about 20 to about 150 pph and more typically about 50 to about 120 pph. After the flakes are intercalated, any excess solution is drained from the flakes and the flakes are water-washed.

Alternatively, the quantity of the intercalation solution may be limited to between about 10 and about 50 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1, 10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_nCOOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend is exposed to temperatures in the range of 25° to 125° C. to promote reaction of the reducing agent and intercalant coating. The heating period is up to about 20 hours, with shorter heating periods, e.g., at least about 10 minutes, for higher temperatures in the above-noted range. Times of one-half hour or less, e.g., on the order of 10 to 25 minutes, can be employed at the higher temperatures.

The thus treated particles of graphite are sometimes referred to as "particles of intercalated graphite." Upon exposure to high temperature, e.g. temperatures of at least about 160° C. and especially about 700° C. to 1000° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact as hereinafter described.

Flexible graphite sheet and foil are coherent, with good handling strength, and are suitably compressed, e.g. by roll-pressing, to a thickness of about 0.075 mm to 3.75 mm and a typical density of about 0.1 to 1.5 grams per cubic centimeter (g/cc). From about 1.5–30% by weight of ceramic additives can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of about 0.15 to 1.5 millimeters. The width of the particles is suitably from about 0.04 to 0.004 mm. The ceramic fiber particles are non-reactive and non-adhering to graphite and are stable at temperatures up to about 1100° C., preferably about 1400° C. or higher. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The flexible graphite sheet can also, at times, be advantageously treated with resin and the absorbed resin, after curing, enhances the moisture resistance and handling strength, i.e. stiffness, of the flexible graphite sheet as well as "fixing" the morphology of the sheet. Suitable resin content is preferably at least about 5% by weight, more preferably about 10 to 35% by weight, and suitably up to about 60% by weight. Resins found especially useful in the practice of the present invention include acrylic-, epoxy- and phenolic-based resin systems, or mixtures thereof. Suitable epoxy resin systems include those based on diglycidyl ether or bisphenol A (DGEBA) and other multifunctional resin systems; phenolic resins that can be employed include resole and novolac phenolics.

Nonetheless, the graphite sheet as prepared above is cut and trimmed to form the desired articles. The methods of the present invention may use the above-described graphite sheets including the trimmed portions. More specifically, the process of the present invention may use the above-described graphite sheets including the trimmed portions at various stages of completeness, as discussed below.

Figure 2:
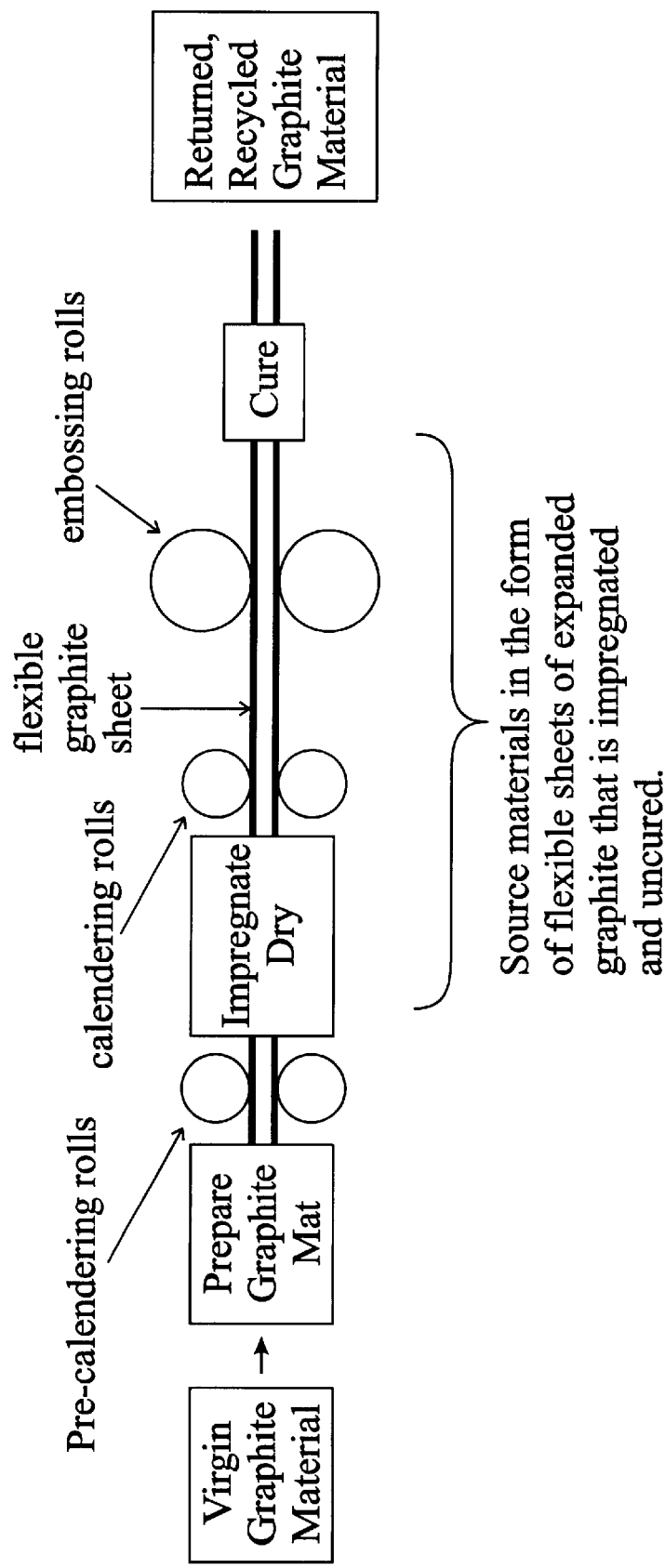
FIG. 2 is a schematic drawing of a process for producing flexible graphite sheets which may be used as source materials in the present invention.

An embodiment of the present invention includes a method of manufacturing flexible sheets of expanded graphite material from recycled materials, comprising providing source materials in the form of flexible sheets of expanded graphite such as the sheets discussed above. The source material may be sheets or trimmed portions of sheets that have been impregnated with resin, but not yet cured. This source is generally shown in FIG. 2. The source material may be used as is or blended with natural graphite flakes.

Once the source material of flexible graphite sheets is available, it can then be comminuted by known processes or devices, such as a jet mill, air mill, blender, etc. to produce particles. Preferably, a majority of the particles have a diameter such that they will pass through 14 U.S. mesh. It may be desirable to cool the flexible graphite sheet when it is resin-impregnated as it is being comminuted to avoid heat damage to the resin system during the comminution process.

Figure 3:
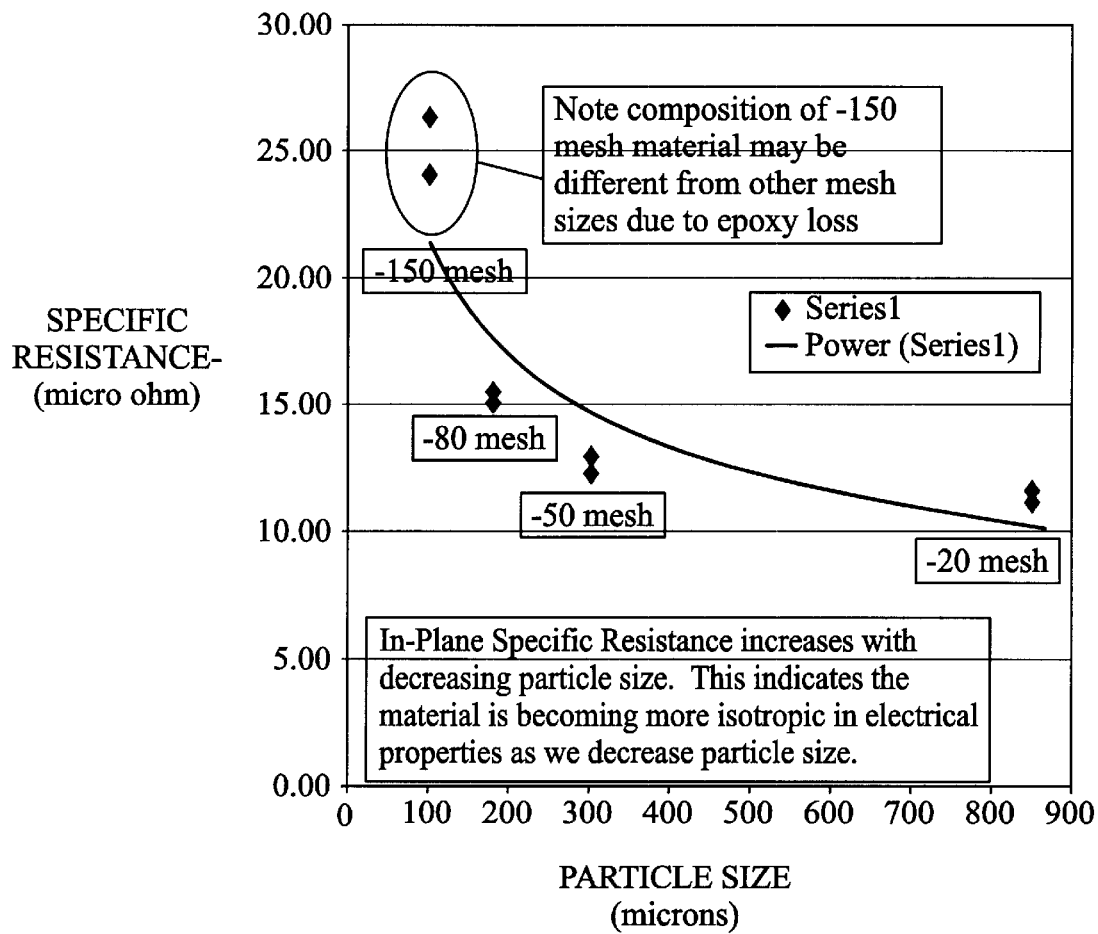
FIG. 3 is a plot of in-plane electrical resistivity versus mesh size.

The size of the comminuted particles may be chosen so as to balance machinability and formability of the graphite article with the thermal characteristics desired. Thus, smaller particles will result in a graphite article which is easier to machine and/or form, resulting in greater part definition, whereas larger particles will result in a graphite article having higher anisotropy, and, therefore, greater in-plane electrical and thermal conductivity. In FIG. 3, a plot of in-plane electrical resistivity versus mesh size is shown to demonstrate the relationship between particle size and anisotropy.

In one embodiment of the process of the present invention, which is illustrated in block diagram form in FIG. 1, a component of a fuel cell is manufactured by:
(a) providing source materials including sheets of uncured resin impregnated graphite materials;
(b) grinding the source materials into uncured particles; and
(c) without re-expanding the particles, molding the uncured particles to form the component.

These source materials may include lengths of complete sheet, trimmings, or any form of scrap from the manufacture of sheets, all of which is to be understood as being covered by the term "sheets" as used herein. Particularly, this source material may be the unused web material from which flow field plates are cut in the manufacturing process of FIG. 2.

The grinding step is performed as described above. In one embodiment of the invention, a majority of the particles preferably have a particle size no greater than about 14 U.S. mesh. The grinding step may also be referred to more generally as comminuting the source materials to form the particles.

The molding step may include any suitable molding process, and particularly die-pressing and iso-static molding are suitable. Such molding processes, using the resin-impregnated uncured particles, produce fuel cell flow field plates having channels formed therein. The plates are of good density and definition. In one embodiment of the invention, the resulting flow field plates have a density of at least about 1.3 g/cm$^3$.

These molding processes may even produce components which are in some ways superior to those formed by embossing of the flexible graphite sheets as shown in FIG. 2, because the high pressure used to die-press or isostatic mold particles would be expected to result in reduce springback of the material as compared to embossing of a calendered sheet. Also the use of higher pressures that can be achieved in die-pressing should result in higher density/higher strength flow field plates.

After the component is molded, it will be cured in a conventional manner.

Significantly, there is no re-expansion step required prior to the molding step. This is contrasted to processes like those of the Hayward patents cited above, wherein particles made from recycled materials must be re-expanded prior to molding.

Also, there is generally no need to add resin to the particles prior to the molding step. Again, this is contrasted to processes like those of the Hayward patents, wherein substantial portions of resin must be added to the particles before molding. Nevertheless, it is within the scope of certain embodiments of the present invention that resin could be added to the particles, although it generally is not necessary due to the pre-existing resin content of the source materials used with the present processes.

In another embodiment of the invention, additives are combined with the particles prior to molding. Such additives may be in the form of fibers or nanotubes. The additives will be of a type useful for modifying physical properties of the article, such as electrical or thermal conductivity. For example, metal fibers may be added to improve electrical conductivity, or carbonizing graphite fiber may be added to improve thermal conductivity.

Because the particles are not re-expanded in the present process, these additives will not be exposed to the high temperatures of a furnace sufficient to destroy the additives, as they would in a process like that of the Hayward patents where the particles are re-expanded. Thus with the present invention, a much broader choice of additives is available.

EXAMPLE

Uncured epoxy impregnated flexible graphite sheet material is comminuted to produce particles 100% of which will pass through 50 mesh. The particles are produced from 70 mg/cm2 sheet having a resin content of approximately 30%. The particles are vacuum die-pressed at approximately 4500 psi, to form a flow field plate for a fuel cell. The plate has a density of 1.31 g/cm$^3$, and has good definition.

All cited patents and publications referred to in this application are incorporated by reference.

The invention thus being described, it will be obvious that it may be varied in may ways. Such variations are not to be regarded as a departure from the spirit and scope of the present invention and all such modifications as would be obvious to one skilled in the art are intended to be included within the scope of the following claims.

We claim:
1. A method of manufacturing a material suitable for the construction of a component of a fuel cell, comprising:
(a) providing source materials including sheets of uncured resin impregnated expanded graphite material;
(b) grinding the source materials into uncured particles; and
(c) without re-expanding the particles, molding the uncured particles to form the material suitable for the construction of the component of the fuel cell.
2. The method of claim 1, wherein:
in step (c), the material has a plurality of channels defined therein.

3. The method of claim 2, further comprising:

after step (c), curing the resin in the material.

4. The method of claim 1, wherein:

the material of step (c) has a density of at least about 1.3 g/cm$^3$.

5. The method of claim 1, wherein:

a majority of the particles have a particle size of no greater than about 14 U.S. mesh.

6. The method of claim 1, further comprising:

prior to step (c), adding an additive to the particles and thereby modifying a physical property of the material which results from step (c).

7. The method of claim 6, wherein the additive is selected from the group consisting of fibers and nanotubes.

8. The method of claim 6, wherein the additive includes a metal fiber to improve electrical conductivity of the material.

9. The method of claim 6, wherein the additive includes fibers or nanotubes to improve thermal conductivity of the material.

10. The method of claim 1, wherein:

in step (c), the molding is performed by die-pressing the uncured particles.

11. The method of claim 1, wherein:

in step (c), the molding is performed by isostatic molding the uncured particles.

12. The method of claim 1, wherein:

in step (c), the molding is performed on the uncured resin-impregnated particles without adding any additional resin to the particles.

13. A method of manufacturing a material suitable for the construction of a component for a fuel cell, comprising:

(a) comminuting uncured resin impregnated expanded graphite into uncured particles; and (b) without re-expanding the particles, molding the uncured particles to form the material suitable for the construction of the component for the fuel cell.

14. The method of claim 13, wherein:

in step (b), the molding is performed on the particles without adding any additional resin to the particles.

15. The method of claim 13, wherein:

between steps (a) and (b), adding a metal fiber to the particles to improve electrical conductivity of the material.

16. The method of claim 13, further comprising:

between steps (a) and (b), adding fibers or nanotubes to the particles to improve thermal conductivity of the material.

17. The method of claim 13, wherein:

in step (b), the molding is performed by a process selected from the group consisting of die pressing and isostatic molding.

18. A method of manufacturing a material suitable for the construction of a component of a fuel cell, comprising:

(a) providing source materials in the form of parts of flexible sheets of uncured resin impregnated expanded graphite;

(b) comminuting the source materials into particles, a majority of the particles having a maximum particle size no greater than about 14 U.S. mesh;

(c) without re-expanding the particles, and without adding any further resin to the particles, molding the particles to form the material, the material having a density of at least about 1.3 g/cm$^3$; and (d) curing the material.

19. The method of claim 18, wherein:

in step (c), the molding includes a molding process selected from the group consisting of die pressing and isostatic molding.

20. The method of claim 18, further comprising:

between steps (b) and (c), adding to the particles an additive selected from the group consisting of a metal additive and carbonizing graphite fibers, whereby exposure of the additive to temperatures sufficient to destroy the additive is avoided due to the absence of any re-expansion of the particles.

* * * * *